United States Patent [19]

Davey et al.

[11] 4,100,933
[45] Jul. 18, 1978

[54] FIRE PROTECTION WATER SUPPLY VALVE

[75] Inventors: John T. Davey; Lawrence P. Kahn, both of Toledo, Ohio

[73] Assignee: Seco Manufacturing, Inc., Toledo, Ohio

[21] Appl. No.: 582,845

[22] Filed: Jun. 2, 1975

[51] Int. Cl.² ............ G05D 16/00; F16K 31/363
[52] U.S. Cl. ............................ 137/495; 137/505.18
[58] Field of Search ........................ 137/505.18, 495

[56] References Cited

U.S. PATENT DOCUMENTS

| 784,408 | 3/1905 | Krichbaum | 137/495 X |
|---|---|---|---|
| 1,984,792 | 12/1934 | Ford | 137/495 |
| 3,456,681 | 7/1969 | Faisandier | 137/505.18 X |

FOREIGN PATENT DOCUMENTS 587,408  4/1947  United Kingdom .............. 137/495

*Primary Examiner*—Alan Cohan
*Attorney, Agent, or Firm*—Barnes, Kisselle, Raisch & Choate

[57] ABSTRACT

A fire protection water supply valve for discharging a high pressure water source at a predetermined lower pressure which includes a manual override to close a control valve in a shut-off and to open the valve to discharge full line pressure and an intermediate position for an automatic pressure control for outlet flow in a desired pressure range.

4 Claims, 2 Drawing Figures

U.S. Patent
July 18, 1978
4,100,933
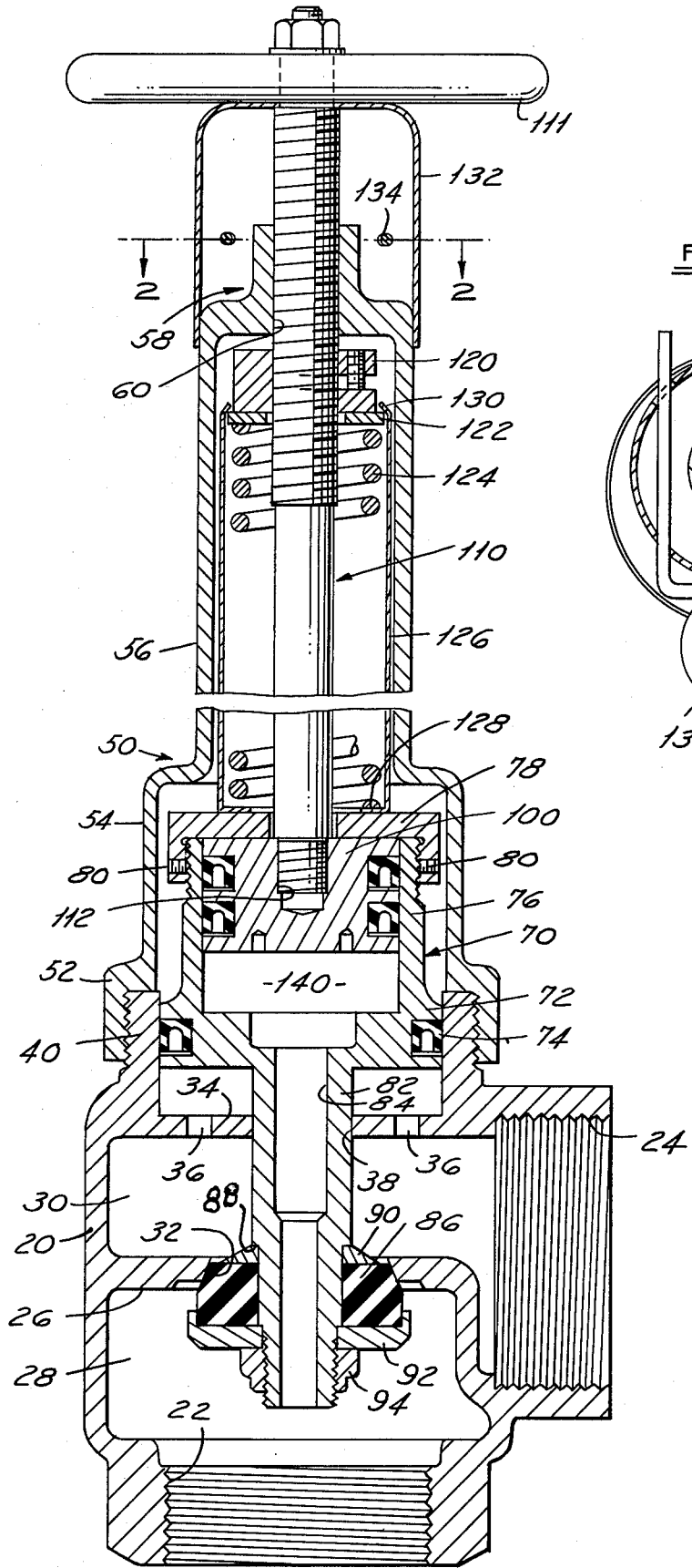
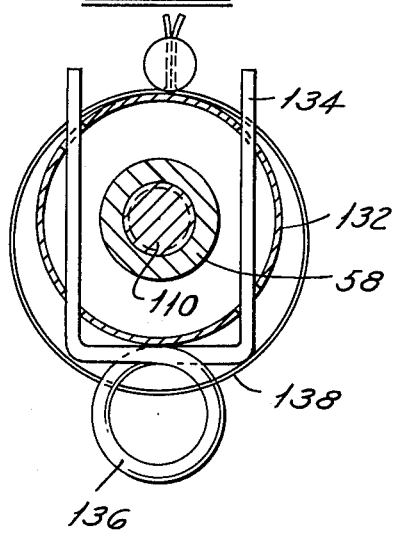

FIRE PROTECTION WATER SUPPLY VALVE

This invention relates to a Fire Protection Water Supply Valve and more particularly to a pressure regulator valve which can limit the pressure being discharged from a supply line but which also may be utilized for full line pressure.

In high rise buildings, quite frequently the water supply for fire protection is stored in a tank at the top of the structure. Since water pressure is in this case dependent on the head (vertical distance from supply to discharge), it will be appreciated that, in the lower floors of the building which is many stories high, the water pressure will be tremendously high. It is necessary then to provide a control for the water outlet in the various floors so that the pressure will not damage the hoses used for playing water on a fire nor will it prevent the actual manual handling of the hose which stiffens with increase in pressure. A U.S. Pat. to Camp, U.S. Pat. No. 3,692,047 (Sept. 19, 1972) illustrates a regulator of the general type involved.

The same need for a pressure reduction may result where main water lines or riser pipes carry the liquid at a high pressure, and it must be distributed locally at lower pressures.

On the other hand, there may be occasions when full line pressure is desired, and it must be possible to convert the pressure reduction valve at will to a full flow valve.

It is an object of the present invention, then, to provide an improved pressure reduction valve which is easily adjustable to varying pressure in different ranges and which operates automatically.

It is a further object to provide a regulator valve which can be readily decommissioned manually to permit full unregulated line flow.

Another object of the invention is the provision of a central valve which has long storage life. Valves of this nature may not be used for long periods of time. The parts of the present valve are designed not to deteriorate in inactive status so that they are always ready for utilization.

A further object of the invention lies in a design which results in the outlet pressure being controlled only by the preset resilient element within the valve and is independent of the inlet pressure.

Other objects and features of the invention relating to details of construction and operation will be apparent in the following description and claims in which the principles of the invention, together with the operation, are set forth in conjunction with the best mode presently contemplated for the practice of the invention.

DRAWINGS accompany the disclosure and the various views thereof may be briefly described as:

FIG. 1, a vertical section of the valve constructed according to the invention.

FIG. 2, a sectional view on line 2—2 of FIG. 1.

With reference to the DRAWINGS, a main mount housing 20 has an internally threaded inlet opening 22, which will be screwed on to a pressure line pipe, and an internally threaded outlet opening 24 which will receive a hose connection nipple. This threading could be reversed or other threading connections or coupling used. This housing has a septum (dividing wall) 26 which defines an inlet chamber 28 and an outlet chamber 30. A valve seat 32 is provided in the septum 26 between the two chambers. This is shown as a tapered seat but could be also a spherical or flat seat.

The top of the housing 20 has a second septum 34 provided with perforations 36 around a central opening 38. Above the septum 34 is an annular, externally threaded collar 40 which serves as a mount for a secondary hollow housing 50 which has three stepped sections, a base 52 threaded on to collar 40, a smaller intermediate section 54, and a still smaller top section 56. A top portion 58 has a threaded central bore 60 to receive a threaded shaft later to be identified.

The operating mechanism within the described housings consists first of a piston-valve assembly with a hollow piston 70, having an annular extension 72 and contained seal 74 slidably disposed in collar 40. A hollow cylindrical portion 76 of the piston moves in housing section 54 and is closed by a threaded cap 78 locked on by set screws 80. A bottom central extension 82 provided with a central bore 84 slides in central opening 38 in the second septum 34 and extends downwardly through the valve seat 32 in the first septum 26. A tapered valve element 86 is mounted on the lower end of extension stem 82 and retained against a positioning shoulder 88 by a top washer and retainer 90 and a bottom shallow cup 92 secured by a nut 94 threaded on the end of stem 82.

A secondary operating assembly consists of a second piston 100 with a double slide seal slidably mounted within the cylindrical portion 76 of piston 70. A threaded control shaft 110, having an operating hand wheel 111 secured at the top, extends downwardly through an opening in piston cap 78 to secondary piston 100 where it is threaded into a recess at 112.

A spring cartridge assembly is mounted around shaft 110 consisting of a top retainer collar 120 which can be locked on the threaded shaft 110, a washer 122, a coil compression spring 124 and a thin metal cover cylinder 126 having an inturned flange 128 below the coil spring and a narrow inturned flange 130 at the top. A Bellville spring assembly or a pneumatic chamber can also be used to provide the pre-selected force.

A domed override cylinder 132 is loosely captive on screw 110 below the handwheel 111 to limit the downward movement of the wheel. This cylinder fits snugly over the top portion 56 of housing 50 and slides relative to the housing. A suitable U-shaped limit wire 134 with a finger ring 136 is provided to transfix the cylinder 132 as shown in FIG. 2. A suitable breakable wire seal 138 can be used to secure the limit wire in place against accidental removal.

IN THE OPERATION, the valve is shown in a closed position with the threaded shaft 110 pulling up on the piston 100 and the cap 78, thus holding the core valve 86 in closed position on seat 32. Inlet water pressure from inlet 22 is acting on the bottom of the valve assembly 86. In this position, inlet water is passing through the central passage 84 to reach and act on the piston 76 in the area below the second piston 100. Since the inlet pressure acts upwardly on the assembly 86 and downwardly on the bottom of chamber 140 in piston 70, there is a balanced condition hydraulically so that inlet pressure does not affect the position of piston 70 when it is in a condition to move.

The outlet pressure desired is set when the valve is assembled by the installation of a properly calibrated spring 124 in the spring assembly.

When it is desired to initiate flow to the outlet, the wheel 111 is turned until the thread on the shaft 110 acting in the top 58 moves down until the legs of the limit wire 134 contact the shoulder top 58. This motion also moves piston 100 down into the chamber 140 in hollow portion 76 which frees the piston assembly 70 to move axially. Spring 124 can then act on the piston assembly 70 to move it downward, thus opening valve 86.

Water can now flow through the valve seat 32 until the outlet pressure acting on the bottom of floating piston assembly 70 (through holes 36 in septum 34) balances the force of the spring 124, thus allowing the floating piston to seek an equilibrium position between the force of spring 124 and force of the outlet pressure. For example, if the outlet pressure overcomes the spring, the valve 86 will close. If the outlet pressure is less than will overcome the spring, the valve will open. A relatively constant outlet pressure at 24 is thus maintained.

If on some occasions it is desirable to override the preset outlet pressure, the sleeve limit wire 134 can be removed by breaking the seal wires 138 and the handwheel 111 turned down until piston 100 contacts the bottom of the chamber in which it is located, thus moving the piston assebmly 70 down to hold the valve 86 open. The wire seal 138 serves as notice to operators and inspectors as to the automatic or manual condition of the valve.

It will be noted that the valve seat 32 in the septum 26 is closed by upward movement of the valve 86. This makes it possible to have the controlling outlet pressure below the pressure responsive piston 70 on the side proximal to the outlet opening 24. Thus, the pressure chamber below the piston will drain through openings 36 when the valve is not in use. Since these valves may stand unused for long periods of time, this condition contributes to keeping the operating parts dry and less subject to electrolysis and corrosion which would interfere with successful operation when called for. In addition, the manual control, while functional to close the valve, is also functional to move the valve mechanically to an open position in the event the parts are not moving automatically.

It will be appreciated that the design of the valve is such that outlet pressure is controlled only by the force of the biasing means 124 and is not influenced by the inlet pressure.

What is claimed as new is as follows:

1. In a fire protection water supply valve of the type including a base housing having an inlet opening and an outlet opening separated by a septum having a valve opening and seat therein and a cylinder portion above said seat, that improvement which comprises:
   (a) a valve and piston assembly connected by a hollow shaft slidable in said housing comprising a valve movable to open and close said seat and a piston spaced from said valve slidable in said cylinder portion of said housing, the bottom of said piston proximal to said outlet being open to said outlet opening, a portion of the top of the piston having an area smaller than the bottom of said piston being open to said inlet opening through said hollow shaft,
   (b) spring means mechanically biasing said piston to an open position,
   (c) means including a control element manually selectively operable in two directions from without said base housing disposed to mechanically shift said piston to move said valve to a closed position to decommission said piston and to move said valve to an open position, and
   (d) a top housing secured to said base housing,
   (e) said piston being hollow to provide an enclosed chamber therewithin, said control element being movable in said chamber, and said last means comprises a shaft movable axially in said top housing to control the position of said control element in said chamber and the position of said valve.

2. A fire protection water supply valve as defined in claim 1 in which said means biasing said piston comprises a compression spring around said shaft bearing against a stop on said shaft at one end and against said piston at the other end.

3. In a fire protection water supply valve of the type including a valve housing having an inlet opening and an outlet opening separated by a septum having a valve opening and valve seat thereon, and means forming a piston chamber in said housing in line with said valve opening separated from said outlet by a perforate septum, that improvement which comprises:
   (a) a valve and piston assembly connected by a hollow shaft slidable in said housing comprising a valve movable to open and close said seat and a piston spaced from said valve slidable in said piston chamber of said housing, the bottom of said piston being open to said outlet through said perforate septum and a portion of the top of said piston having an area smaller than the area of the bottom of said piston and substantially equal to the area of said valve being open through said hollow shaft to said inlet,
   (b) means resiliently biasing said piston and valve to an open position,
   (c) an extension housing projecting from said piston chamber having an external shoulder stop and having a recess for receiving said biasing means,
   (d) means on said extension housing manually movable to control the position of said valve, and
   (e) means on said manually movable means to contact said shoulder stop after a predetermined motion to subject said valve and piston to the operation of said resilient means.

4. A fire protection water supply valve as defined in claim 3 in which said contact means comprises a domed cylinder slidable on said extension housing and removable means transfixing said cylinder positioned to contact said shoulder stop to limit the motion.

* * * * *